(12) United States Patent
Caplan et al.

(10) Patent No.: US 6,919,847 B2
(45) Date of Patent: Jul. 19, 2005

(54) SYSTEM USING A MEGAWATT CLASS MILLIMETER WAVE SOURCE AND A HIGH-POWER RECTENNA TO BEAM POWER TO A SUSPENDED PLATFORM

(75) Inventors: Malcolm Caplan, Fremont, CA (US); Herbert W. Friedman, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 37 days.

(21) Appl. No.: 10/741,022

(22) Filed: Dec. 19, 2003

(65) Prior Publication Data

US 2004/0156400 A1 Aug. 12, 2004

Related U.S. Application Data

(60) Provisional application No. 60/442,331, filed on Jan. 23, 2003, and provisional application No. 60/482,625, filed on Jun. 25, 2003.

(51) Int. Cl.[7] .................................................. H01Q 1/28
(52) U.S. Cl. ........................................................ 343/705
(58) Field of Search ............................... 343/832, 839, 343/843, 912, 705, 708, 709; 244/3.13, 3.14, 3.21, 158 R

(56) References Cited

U.S. PATENT DOCUMENTS

| 5,043,739 | A | | 8/1991 | Logan et al. |
|---|---|---|---|---|
| 5,068,669 | A | | 11/1991 | Koert et al. |
| 5,218,374 | A | * | 6/1993 | Koert et al. ............... 343/789 |
| 5,503,350 | A | * | 4/1996 | Foote ....................... 244/1 R |
| 5,685,505 | A | | 11/1997 | Meckler |
| 6,087,985 | A | * | 7/2000 | Rummeli et al. .......... 342/359 |

OTHER PUBLICATIONS

A. Alden et al, Single Foreplane High Power Rectenna. "Electronics Letters", May 21st, 1992, vol. 28, No. 11.
A. Alden, "A 35 GHz Extremely High Power Rectenna For The Microwave Lightcraft". Communications Research Centre, Ottawa, Canada, pp. 292–300.

* cited by examiner

*Primary Examiner*—Shih-Chao Chen
*Assistant Examiner*—Minh Dieu A
(74) *Attorney, Agent, or Firm*—Michael C. Staggs; Alan H. Thompson

(57) ABSTRACT

A system for beaming power to a high altitude platform is based upon a high power millimeter gyrotron source, optical transmission components, and a high-power receiving antenna (i.e., a rectenna) capable of rectifying received millimeter energy and converting such energy into useable electrical power.

32 Claims, 3 Drawing Sheets

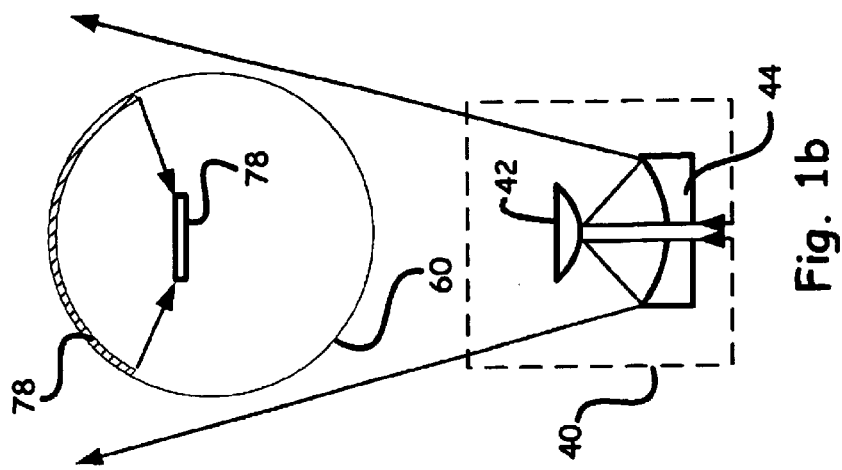
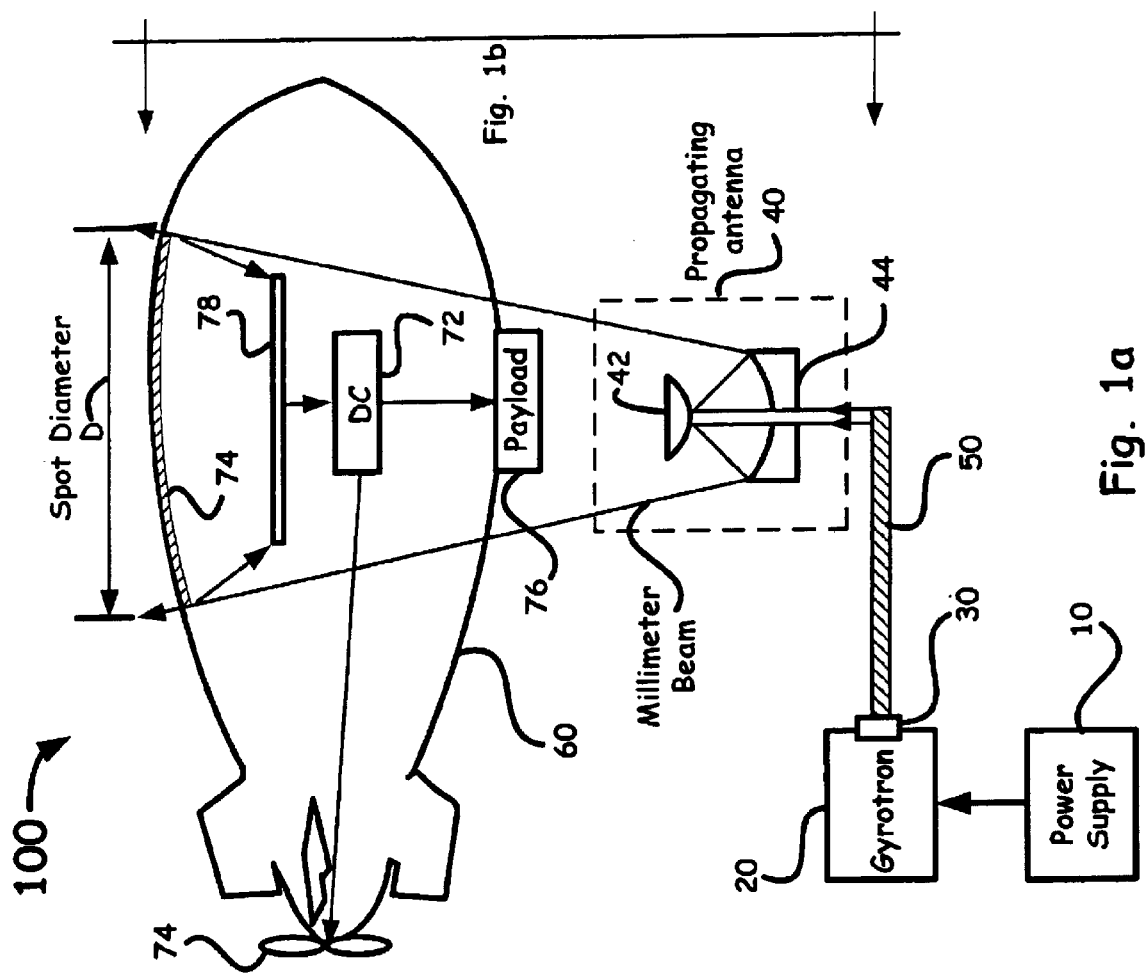

SYSTEM USING A MEGAWATT CLASS MILLIMETER WAVE SOURCE AND A HIGH-POWER RECTENNA TO BEAM POWER TO A SUSPENDED PLATFORM

RELATED APPLICATION

This application claims the benefit of U.S. Provisional Application No. 60/442,331, filed Jan. 23, 2003, and U.S. Provisional Application No. 60/482,625, filed Jun. 25, 2003, both entitled, "A System Using a Megawatt Class Millimeter Wave Source and a Field Emitting Diode-Rectenna to Beam Power to a Suspended Platform," which are incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates in general to the art of power beaming and more particularly to a millimeter wave power beaming system.

2. Description of Related Art

Power beaming energy from a first location (e.g., on Earth, a high altitude suspended platform or a satellite) to a remote location (e.g., on Earth, a high altitude suspended platform or a satellite) has provided particular problems known only to those skilled in the art. Early attempts to develop a system for transmitting energy to power a remote device with a high degree of efficiency is described in, "The History of Power Transmission by Radio Waves" by William C. Brown, IEEE Transactions on Microwave Theory and Techniques, Vol. MTT-32, No. 9, September 1984, wherein the article describes research into an apparatus that allows power to be sent from the Earth to a device above the Earth via a 2.45 GHz radio signal.

Remote devices (e.g., high altitude platforms) if kept aloft by received transmitted energy, can be implemented in applications that include surveillance, weather and pollution monitoring, and communications. An altitude range between about 60,000 ft and about 100,000 ft is beneficial because it lays above the jet stream where the wind velocity is low and where the drag is minimum. At higher altitude, the reduction in atmospheric density makes flight difficult for these non-orbiting platforms. A benefit of utilizing such high altitude platforms is the stationary nature of the flight path, which gives a constant presence. Cost is also minimized when utilizing such platforms along with the ability to recover expensive payloads.

Platforms that carry their own fuel, both lighter than aircraft (balloons or airships) and conventional aircraft, cannot stay aloft for time periods (e.g., months to years) that are presently envisioned. Platforms that rely on solar power suffer from the weight of the large area solar cells and the requirement of energy storage for nighttime operation and higher than average peak propulsion loads.

An energy storage scheme proposed by NASA is to provide regenerative fuel cells whereby solar energy during the daytime is used to break water into hydrogen and oxygen. Fuel cells then recombine the two gases during the nighttime hours for the needed electrical power. However, such a scheme, while attractive in concept, provides for an efficiency of only about 50% and the weight is high, thereby lowering an allowed payload.

Power beaming using microwave frequencies has been discussed and partially demonstrated for several decades using low frequencies in the ISM band at 2.45 GHz. Such a long wavelength allows for inexpensive magnetron sources such as those used in microwave ovens that can be phase locked for large arrays. However, the size of the transmitting arrays is too large for mobile and tactical applications.

Conversion of such beam powered electromagnetic radiation into useful electrical power by a receiving antenna (i.e., a rectenna or rectifying antenna) has also been utilized in the past but has not received significant recent development. Such a device is typically mounted on the lower surface of an aircraft where it rectifies the electromagnetic energy of the appropriate wavelength into DC energy. The DC energy is then used to power the aircraft's propulsion system and on-board systems. Background information on beam powered systems that utilize a rectenna is described and claimed in U.S. Pat. No. 5,503,350, entitled "Microwave-Powered Aircraft," issued Apr. 2, 1996 to Foot and in U.S. Pat. No. 5,068,669, entitled "Power Beaming System," issued Nov. 26, 1991 to Koert et al.

The standard configuration for a rectenna is a pair of quarter wave dipole antennas connected by a diode to form the microwave analog of a half wave rectifier circuit. The combination of a quarter wave dipole and a diode form a half wave dipole antenna with current flowing in only one direction. While there have been attempts to fabricate a large area rectenna using such a configuration that includes a single Shottky diode as a rectifying element, several factors, such as low reverse breakdown voltages at the junction, low current densities during forward biasing, and high junction capacitances have combined to limit power densities on the rectenna, thus requiring large areas to convert the received millimeter wave energy to DC power. Moreover, the large rectenna panels add to the weight and cost of such a receiving system.

Background information for rectennas is described and claimed in U.S. Pat. No. 4,943,811, entitled "Dual Polarization Electromagnetic Power Reception And Conversion System," issued Jul. 24, 1990 to Alden et al. Further information on rectennas is described in "A 35 GHz Extremely High Power Rectenna For The Microwave Lightcraft," by Alden et al., American Institute of Physics, pp. 292–300, 2003. Additional information on rectennas is described and claimed in U.S. Pat. No. 5,043,739, entitled "High Frequency Rectenna," issued Jan. 14, 1992 to Logan et al., and assigned to the assignee of the present application.

Accordingly, the present invention addresses a need for a system that includes a megawatt millimeter wave beam power source and a receiving system, such as an improved rectenna design, to enable a high altitude platform to operate at predetermined altitudes for extended periods of time over wide portions of the globe.

SUMMARY OF THE INVENTION

The present invention is directed to a method for transferring power from a first location to a remote location such as a high altitude suspended platform, which includes: providing a power transmitting system that includes a millimeter wavelength source, transferring the power from the source by directing the source onto a foil reflector on the platform; and by utilizing a high-power rectenna device to convert focused power into useable electrical power.

Another aspect of the present invention is directed to a system that transfers power from a first location to a remote location such as a high altitude suspended platform. Such a system includes a millimeter wave source of power, a foil reflector for receiving the power, and a high-power rectenna that converts focused power into useable electrical power.

A further aspect of the present invention is directed to a system, which includes a millimeter wave source of power, a propagating antenna that includes a water-cooled sub-reflector, a foil reflector for receiving the power, and a high-power rectenna that converts focused power from the reflector into useable DC electrical power.

Accordingly, the present system and method provides a desired system and method for beaming power from Earth to a suspended platform at high altitude so as to provide useful power for propulsion, station keeping and payload utility. Such a system and method can be implemented in applications that include surveillance, weather and pollution monitoring, telephony, military defense applications, and communications.

BRIEF DESCRIPTION OF THE DRAWINGS

FIG. 1a illustrates the beam powering and high-power rectenna system of the present invention.

FIG. 1b illustrates a simplified cross-section side-view of the system as shown in FIG. 1a.

DETAILED DESCRIPTION OF THE INVENTION

Figure 2:
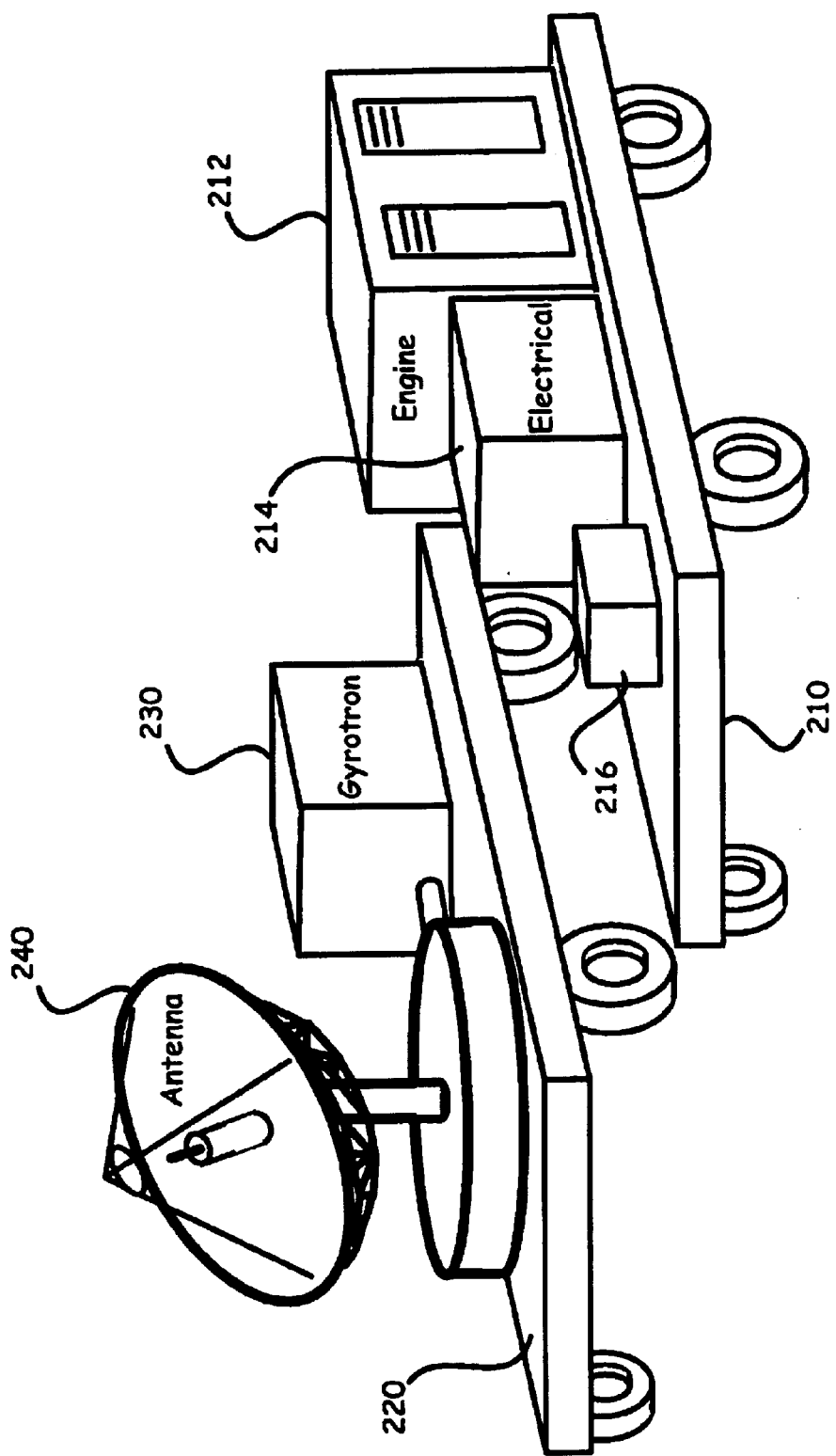
FIG. 2 shows the ground based system mounted on a mobile platform.

Referring now to the following detailed information, and to incorporated materials; a detailed description of the invention, including specific embodiments, is presented.

Unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

General Description

The present invention provides a power beaming system for transmitting electromagnetic energy having wavelengths from about 2 to about 10 millimeters (i.e., from about 145 GHz to about 30 GHz) between a first location that is capable of being positioned on Earth, a high altitude platform or a satellite, and a remote location, such as for example, a high altitude suspended platform, another location on earth or perhaps a satellite. More often, the remote location is a high altitude suspended platform positioned at a predetermined altitude between about 10,000 ft and about 100,000 ft. Such a platform can receive a power from, for example, an Earth-based system in sufficient quantities to be useful for station keeping, powering electrical equipment on board, and/or for payload requirements.

Specific Description

FIG. 1a illustrates the basic geometry for the present beam powering/suspended platform system and is generally designated as reference numeral 100. An example power supply 10 can deliver required electrical energy to a gyrotron source 20 and enable such a source to produce frequencies between about 30 GHz and about 40 GHz, more often at about 35 GHz through an output window 30 feeding a propagating antenna 40 (shown enclosed by a dashed box) by means of a waveguide transmission system 50, such as, but not limited to an over-moded (i.e., high order beam), often a corrugated, quasi-optical waveguide transmission line.

When millimeter-wave radiation passes through the Earth's atmosphere, it suffers from two types of attenuation, molecular and aerosol, the latter composed of clouds, rain and particles. For molecular absorption, certain local minima or "windows" exist at narrow bands centered about 35 GH, 94 GH and 140 GHz, with the strength of the absorption increasing with frequency. Hence in the absence of aerosol absorption, the 35 Ghz band has the higher transmission. Aerosol attenuation increases monotonically with frequency with the result that for light to moderate rain, 35 GHz not seriously attenuated. For heavy rain, the 35 GHz radiation is attenuated by a factor of about 2–3 times and extra margin would be needed in this case to maintain a fixed power at the airship altitude. For 94 GHz, the attenuation in heavy rain is over a factor of about 5 and therefore not practical.

Gyrotron source 20 is often a ground or ship based source capable of generating megawatts of millimeter wave CW power in a circularly polarized beam format. High power gyrotrons (i.e., gyrotrons that can generate up to a megawatt) have been under development for the nuclear fusion program over the past decade and are now commercially available. Exemplary tube requirements for the millimeter wave source of the present invention include a supply voltage of 80 kV, a current of 35 A and a magnetic field of 14,000 G, wherein the field magnet can include a cryogen free closed system with a power consumption capability of about 4 kW. A beneficial gyrotron tube output is a TE6, 2 whispering galley mode at 35 GHz, converted to a linearly polarized Gaussian mode using a low loss Vlasov coupler. Such a mode can be propagated out of the vacuum tube through about a 3-inch diameter CVD diamond window to the quasi-optic transmission system feeding propagating antenna 40.

An exemplary arrangement for transmission system 50 can include a 3 inch corrugated quasi optical HE11 waveguide capable of transmitting 1MW, 35 GHz linearly polarized, gaussian microwave power with less than 1% loss/100 meters. A final corrugated mitre bend just preceding antenna 40 converts the linearly polarized gaussian into the required circularly polarized wave.

Antenna 40 structure is of the "Beam Wave" type where power is fed through the center, then reflected off of a water cooled sub-reflector (secondary) 42 on to the main dish (primary) 44. A standard, commercial KA band 5-meter antenna with pointing and tracking system is capable of being modified to accept such input feed and sub-reflector structures. A surface finish on the antenna of the order of 100 microns standard deviation roughness enables a transmitted beam to spread no more than 10% of the ideal diffraction limited value.

By way of example, system 100 in transmitting a 35 GHz beam from gyrotron source 20 up to an altitude of about 20 km using a propagating antenna 40 of about 5 m in diameter, can produce a spot diameter (denoted by the letter D) of about 40 m at a predetermined target area located on suspended platform 60, such as an airship (balloon). With about a 1 MW of source power, the power density at the 20 km altitude is about 2 kilowatts per square meter (200 mW/cm$^2$) in the central region of spot diameter D, only slightly higher than solar flux.

While it is possible to cover large areas of platform 60 having example dimensions up to about 100 m long and up to about 30 m in diameter with a large receiving antenna (e.g. a rectenna having dimensions covering a substantially portion of the aircraft), the cost and weight penalty can be prohibitive. However, such a large receiving antenna can convert the power delivered by antenna 40 into usable DC power that can be stored by operable electronics 72 so as to deliver necessary electrical energy to various on-board components, such as, but not limited to, a propulsion system 74 and a payload 76.

A beneficial arrangement of the present invention is to redirect and intensify the beam transmitted from source 20, by a reflector 74 (as shown in FIG. 1a and in simplified side view FIG. 1b), such as, but not limited to, a foil constructed by applying a thin metallic coating (e.g., aluminized Mylar) to the top half of platform 60. The platform itself, as one arrangement, can include a fabric housing (not shown) opaque to visible light but transparent to millimeter wavelengths, enabling reflector 74 to receive transmitted radiation from the ground transmission source (i.e., millimeter waves from source 20) and focus such received radiation to a high-power rectenna 78 arranged inside the airship, adding only up to about 10 kg to the total weight.

With a concentration factor of at least about 100, the millimeter wave beam impinges on high-power rectenna 78 having an area of less than about 20 m$^2$, often having an area of about 10 m$^2$, with a radiance of greater than about 200 mW/cm$^2$, often greater than about 500 mW/cm$^2$, more often between about 1 W/cm$^2$ and about 10 W/cm$^2$, which is an intensity well within the range that can be actively cooled, especially with helium as the working gas. An example rectenna design (e.g., with distributed diodes) can provide up to 500 kW of DC electric power for propulsion, stationkeeping and payload requirements.

In a standard configuration, the dimensions of each rectenna element are nearly one wavelength square, with a single diode per half-wave dipole receiving antenna. With a DC output of diodes at 35 GHz limited to less than 50 mW, greater than 1000 m$^2$ of rectenna area is required for such a megawatt HAA application, which results in a prohibitive weight and cost penalty. To avoid these problems, the present invention, as discussed above, includes a lightweight concentrator (i.e., reflector 74, as shown in FIG. 1) in addition to a high-power rectenna. An example high-power rectenna can be constructed using spatial combining techniques of solid-state elements to generate higher power densities that could otherwise be achieved using conventional methods. Using small, contiguous dipoles for the collection of the incident wave power, the size of each rectenna element can be reduced, thereby raising the power density to the 10 W/cm$^2$ required for use in the present invention. Such a similar system is described in "A 35 GHz Extremely High Power Rectenna For The Microwave Lightcraft," by Alden et al., American Institute of Physics, pp. 292–300, 2003.

An incident wave power density of 10 W/cm$^2$ produced by the present and a nominal rectenna efficiency of 50% requires a rectenna element density of 200 diodes/cm$^2$ to match the power-handling capability of the diodes while operating at, for example, 35 GHz. With an example rectenna area of less than about 20 m$^2$, often an area of about 10 m$^2$, a predetermined density requiring such a large number of diodes dictates the use of a monolithic approach. As a beneficial arrangement, the rectenna area can be made up of a number of tiles each trimmed from, for example, a 30 cm diameter wafer either to a square or a hexagon. Each tile can include an array of dipoles and Schottky diodes interconnected to meet the voltage requirements of the HAA platform.

The technology needed to produce such a wafer is similar to that already used by manufacturers of planar GaAs Schottky diodes. Whereas for discrete devices, the manufacturer cuts up the wafer into individual chips; for the rectenna, the wafer is left integral, with the addition (during processing) of a deposited metallic interconnection between diodes. This interconnection constitutes the contiguous dipole of the high-power rectenna design. Thinning of the wafer may be necessary to prevent substrate modes and their degradation of rectenna collection efficiency. The wafer sits on a low-dielectric carrier with a metal backing to improve the efficiency of collection. Forced-helium convective cooling of the diodes is more than adequate at these diode power dissipation levels.

As another arrangement for the high-power rectenna of the present invention, a standard rectenna configuration having a centerfed diode in a half-wave dipole antenna can be configured as a rectenna that can handle high powers by replacing the Shottky diode with a field-emitting diode. The field-emitting cathodes for these diodes are generally sharp, metallic micro-formed tips, silicon oxide enhanced edges or textured carbon surfaces. The essential features of all of these cathodes are high current densities, high reverse voltages and surfaces that can be cooled effectively. Such a similar device is described and claimed in U.S. Pat. No. 5,043,739, entitled "High Frequency Rectenna," issued Jan. 14, 1992 to Logan et al., assigned to the assignee of the present application and which, is fully incorporated herein by reference in its entirety.

As a further arrangement, the rectenna design can include a resonant cavity in a closed box in which a microwave mode can be excited to high levels. Power input to the resonant cavity is accomplished through coupling apertures designed to minimize losses. Typically, the shape of the cavity is chosen to enhance the electric field at a point and it is at this point where a field-emitting cathode is placed. Rectifying action takes place when the cathode emits electrons on one-half of the RF cycle. A resulting electron beam charges the cavity endplate to the operating voltage. This end plate is electrically isolated from the body of the cavity.

FIG. 2 illustrates an example arrangement having the entire ground based portion of the power beaming system mounted on, for example, a pair of flatbed trucks or other suitable mobile platform. By way of example, the prime power source, which can include, a 2,000 hp gas or diesel-engine 212, a 2 MW electrical power supply 214, and cooling and switch-gear utilities 216 can be mounted on a first platform 210. A second platform 220 can include a 1 MW gyrotron transmission system 230, a 5 m antenna 240, and an acquisition and a pointing control system (not shown).

The acquisition and tracking of a high altitude platform, such as a balloon, can be accomplished by a simple transponder in conjunction with a passive tracker. In such an acquisition and tracking system, a tracker can be a radar receiver with a quad cell detector at the focus such that the entire tracker can be moved to center the transponder signal. The coordinates of the tracker are then read out using an encoder and used to feed a fine scale-tracking device, which actually points antenna 40 as shown in FIG. 1. The tracker has an 8-ft receiving antenna and typically operates at the X band microwave frequency.

The millimeter wave system having the magnitude of the power levels disclosed herein in the present invention presents safety concerns that require early aircraft detection coupled with beam shutter systems, EMI interference protection, and personnel keep out zones.

The present invention provides for aircraft detection with several tiers of possible protection. For example, the present invention can be equipped with a wide-angle acquisition radar system using a modified marine radar approach. Although such a system produces a conical scan pattern and thus leaves a hole around a zenith, such a radar system can produce long-range data on approaching aircraft.

Another solution is to supplement the wide-angle radar system with a radar mosaic feed compiled from FAA radars located close to the millimeter transmission site. Commercial companies can supply hardware and software to compile the mosaic and deliver it to the transmission safety system in the form of aircraft vectors, speed, altitude, etc. Such a system can easily be automated into the gyrotron safety system and operate, for example, mechanical shutters to block the gyrotron transmission output upon impending approach of an aircraft.

Figure 3:
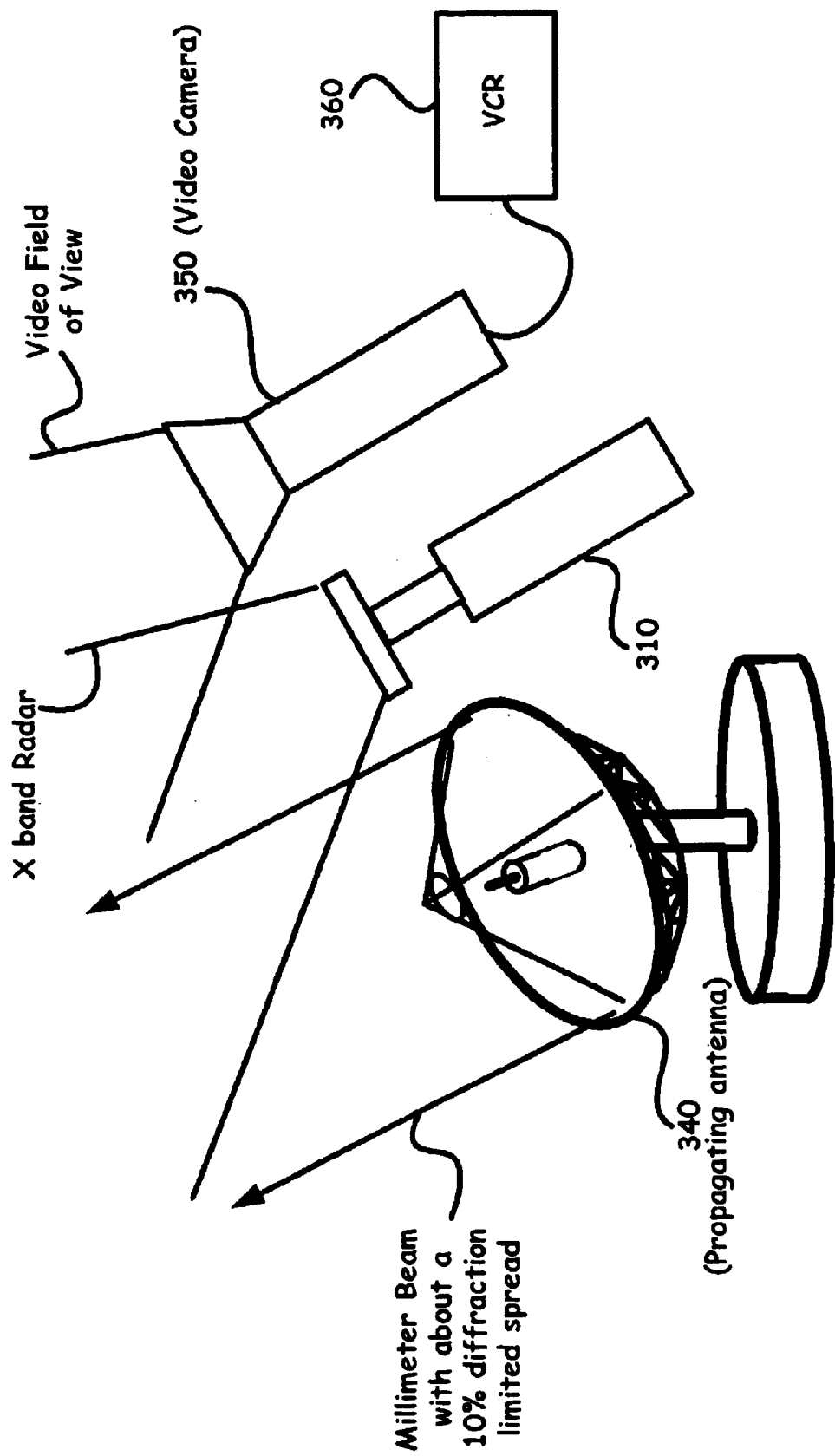
FIG. 3 illustrates an aircraft avoidance system.

FIG. 3 illustrates another solution of the aircraft avoidance system by supplementing the above systems with a narrow-angle radar 310 similar to the one described for the acquisition radar. Such a radar 310 can be aligned to the millimeter beam transmitted from the propagating antenna 340 disclosed herein and designed to automatically close a mechanical shutter (not shown) to block the output from the source in case an aircraft is missed by either of the first two tiers of such a safety system. The speed of the entire shutter system is sufficiently fast so that the shutter is closed before the aircraft can pass from the radar beam edge to the center of the radar field of view where the source beam is located.

Moreover, adjacent to the radar is a video camera 350, which is also designed to align with the millimeter beam. The concept is to view the aircraft with video camera 350, which is set up to have a slightly larger field of view (e.g., greater than about 10 degrees divergence) than the narrow angle radar 310 (e.g., greater than about 7 degrees divergence). The video image is saved on a VCR 360. Once the aircraft enters the radar field of view, the return signal closes a shutter and also triggers a small UV flash which appears as a white frame in the VCR for marking purposes. Beyond that point in time, the video monitors the aircraft's passage through its field of view and confirms that the source (i.e., the gyrotron) beam is indeed blocked. This record provides proof of the effectiveness of the aircraft avoidance system, especially for insurance records.

With respect to EMI concerns, the configuration of having the high-power rectenna array facing upwards towards the reflector, as shown in FIG. 1, may cause compatibility problems with ground-based systems via reflection from the reflector as a result of rectenna-generated EMI. Any significant radiation by this mechanism can be reduced using frequency-selective surfaces configured above a high-power rectenna arranged in the present invention. In addition, direct edge diffraction and EMI radiation towards the horizon or other on-board systems can be prevented by an absorber shroud positioned around the perimeter of the high-power rectenna.

Finally, personnel operating the transmission source platform are required to follow strict protocols and fail-safe barricades can prohibit direct access to the propagating antenna that directs the high-power source frequencies.

The present invention provides a system for transmitting millimeter waves between Earth and a suspended platform of up to about a megawatt in power that is capable of being DC rectified for maintaining the orbit, propulsion, and payload requirements of such a suspended platform. Changes and modifications in the specifically described embodiments can be carried out without departing from the scope of the invention, which is intended to be limited only by the scope of the claims.

What is claimed is:

1. A method of beaming power from a first location to a remote location, comprising:
providing a high altitude suspended platform,
providing a power transmitting system that includes a millimeter wavelength source at said first location,
transferring power produced by said millimeter wavelength source by directing said source onto a foil reflector on said platform; and
providing a high-power rectenna, said rectenna arranged on said platform to receive a focused power from said reflector, wherein said rectenna rectifies said focused power into useable electrical power.

2. The method of claim 1, wherein said millimeter wavelength source comprises at least one frequency selected from about 35 GHz, about 94 GHz, and about 140 GHz.

3. The method of claim 1, wherein said source includes a gyrotron configured to transmit up to about a megawatt of millimeter wave power.

4. The method of claim 1, wherein said high-power rectenna comprises a resonant cavity that further includes a field emission diode.

5. The method of claim 1, wherein said high-power rectenna comprises a field emission diode in a half-wave dipole antenna configuration.

6. The method of claim 1, wherein said high-power rectenna comprises high-density Shottky diodes.

7. The method of claim 1, wherein said foil reflector is configured to receive a transmitted beam from said source of up to about 40 m in diameter.

8. The method of claim 7, wherein said foil reflector comprises a thin metallic coating applied to the top of said platform.

9. The method of claim 1, wherein said high-power rectenna is configured to receive said focused power comprising greater than about 200 mW/cm$^2$.

10. The method of claim 1, wherein said high-altitude platform includes a fabric housing opaque to visible light but transparent to millimeter wavelengths.

11. The method of claim 1, wherein said useable electrical power can be directed to provide power for at least one function selected from: station keeping, propulsion, and payload utility.

12. A power beaming system for transferring power from a first location to a remote location, comprising:
a high altitude suspended platform,
an electromagnetic radiation source positioned at said first location and configured to transfer a predetermined power to said high altitude suspended platform,
a foil reflector on said high altitude platform to receive said predetermined power; and a high-power rectenna on said high altitude platform, arranged to receive a focused power from said foil reflector, wherein said rectenna rectifies said focused power into useable electrical power.

13. The system of claim 12, wherein said source includes a gyrotron configured to transmit up to about a megawatt of power.

14. The system of claim 12, wherein said source comprises at least one frequency selected from about 35 GHz, about 94 GHz, and about 140 GHz.

15. The system of claim 12, wherein said high-power rectenna comprises a resonant cavity that further includes a field emission diode.

16. The system of claim 12, wherein said high-power rectenna comprises a field emission diode in a half-wave dipole antenna configuration.

17. The system of claim 12, wherein said high-power rectenna comprises high-density Shottky diodes.

18. The system of claim 12, wherein said foil reflector is configured to receive a transmitted beam from said source of up to about 40 m in diameter.

19. The system of claim 18, wherein said foil reflector comprises a thin metallic coating applied to the top said platform.

20. The system of claim 12, wherein said high-altitude suspended platform includes a fabric housing opaque to visible light but transparent to millimeter wavelengths.

21. The system of claim 12, wherein said high-power rectenna is configured to receive said focused power comprising greater than about 200 mW/cm$^2$.

22. The method of claim 12, wherein said useable electrical power can be directed to provide power for at least one function selected from: station keeping, propulsion, and payload utility.

23. A power beaming system for transferring power from Earth to a high altitude suspended platform, comprising:

a gyrotron source,
a beam wave propagating antenna further comprising a water-cooled sub-reflector, wherein said antenna is configured to transfer power received from said source to said high altitude platform
a foil reflector arranged on said high altitude platform to receive said power; and
a high-power rectenna on said high altitude platform arranged to receive a focused power from said foil reflector, wherein said rectenna rectifies said focused power into useable DC electrical power.

24. The system of claim 23, wherein said gyrotron source is configured to transmit up to about a megawatt of power.

25. The system of claim 23, wherein said source comprises at least one frequency selected from about 35 GHz, about 94 GHz, and about 140 GHz.

26. The system of claim 23, wherein said high-power rectenna comprises a resonant cavity that further includes a field emission diode.

27. The system of claim 23, wherein said high-power rectenna comprises a field emission diode in a half-wave dipole antenna configuration.

28. The system of claim 23, wherein said high-power rectenna comprises high-density Shottky diodes.

29. The system claim 23, wherein said high-power rectenna is configured to receive said focused power comprising greater than about 200 mW/cm$^2$.

30. The system of claim 23, wherein said foil reflector comprises a thin metallic coating applied to the top of said platform.

31. The system of claim 23, wherein said high-altitude suspended platform includes a fabric housing opaque to visible light but transparent to millimeter wavelengths.

32. The method of claim 23, wherein said useable electrical power can be directed to provide power for at least one function selected from: station keeping, propulsion, and payload utility.

* * * * *